(12) United States Patent
Tamir et al.

(10) Patent No.: US 6,559,884 B1
(45) Date of Patent: May 6, 2003

(54) VIRTUAL STUDIO POSITION SENSING SYSTEM

(75) Inventors: Michael Tamir, Tel-Aviv (IL); Avi Sharir, Ramat Hasharon (IL)

(73) Assignee: Orad Hi-Tec Systems, Ltd., Kfar Saba (IL)

( * ) Notice: Subject to any disclaimer, the term of this patent is extended or adjusted under 35 U.S.C. 154(b) by 0 days.

(21) Appl. No.: 09/148,566

(22) Filed: Sep. 4, 1998

(30) Foreign Application Priority Data

Sep. 12, 1997 (GB) .............................................. 9719379

(51) Int. Cl.⁷ ............................................... H04N 9/04
(52) U.S. Cl. ................... 348/207.99; 348/135
(58) Field of Search ................................. 348/586, 584, 348/585, 47, 135, 159, 207, 722, 592, 598, 169; 382/154, 106, 108

(56) References Cited

U.S. PATENT DOCUMENTS

| 5,227,985 A | | 7/1993 | DeMenthon | |
| 5,394,517 A | * | 2/1995 | Kalawasky | 395/129 |
| 5,889,550 A | * | 3/1999 | Reynolds | 348/139 |
| 6,310,644 B1 | * | 10/2001 | Keightley | 348/140 |

FOREIGN PATENT DOCUMENTS

| DE | 94 18 382 U1 | 3/1996 |
| WO | WO96/32697 | 10/1996 |

OTHER PUBLICATIONS

Keren Greene, IBC 97—Virtual Production Camera Position Measurement System (BBC R&D Publications—Technical Information on Projects), Sep. 5, 1997, BBC R&D, retrieved from: www.bbc.co.uk/rd/projects/virtual/camera.html [retrieved on: May 7, 2002].*

Thomas et al, "A versatile Camera Position Measurement System for Virtual Reality TV Production," International Broadcasting Convention, No. 447, pp. 284–289, Sep. 12–16, 1997.

Kansy et al., "Bildbasierte Kamerafuhrung im Virtuellen Studio," Fernseh–UND Kino–Technik, 50, pp. 27–32, Jan., 1996.

Database WPI, Section EI, Week 9822, Derwent Publications Ltd., London, GB; Class S02, AN 98–246456, XP002080725 & JP 10 078304 (Nippon Telegraph) Mar. 24, 1998 (abstract).

* cited by examiner

*Primary Examiner*—Andrew Christensen
*Assistant Examiner*—Eric Wisdahl
(74) *Attorney, Agent, or Firm*—Fish & Richardson P.C.

(57) ABSTRACT

Apparatus and method for inserting virtual objects into a video sequence including a camera position sensing system which uses LED's to provide perspective information for the camera sensing system thereby allowing natural scenery to be used.

20 Claims, 4 Drawing Sheets

VIRTUAL STUDIO POSITION SENSING SYSTEM

The present invention relates to a virtual studio and in particular to position sensing system for such a studio.

In virtual studio systems a chroma-key background is provided in front of which an actor stands. In the TV picture seen by the viewer the chroma-key background is replaced by a virtual scene. Such a system is described in PCT Patent Application No. WO95/30312 to the present applicant.

In the above known system the position of the camera is calculable by using a coded pattern on the chroma-key background. This enables the position of the camera, as well as its orientation and the lens zoom, to be continuously calculated and thereby the perspective of the virtual 3D set can be adjusted correctly to suit the camera position.

This works perfectly for cameras which have a fixed focus and zoom or a fixed position but problems can be encountered in situations where the cameraman is free to simultaneously change the camera position and the lens zoom. For example, when the camera's optical axis is perpendicular (or almost perpendicular) to the patterned wall, the changes in the captured pattern due to zooming of the lens or to changing the distance of the camera from the wall are identical (or almost identical) and the system cannot extract the correct solution from the captured pattern.

The system of WO95/30312 also works well providing that the background panel is a patterned chroma-key panel. However the system does not work where a normal studio or stage set with real background is used.

Thus, if it is desired to position a virtual 3D object in a normal stage set this cannot be done except for a static camera because the position of the camera relative to the stage set cannot be calculated as the camera moves.

It is a first object of the present invention to enable the position of a camera to be calculated in a normal stage set in which the stage set may comprise a real background.

It is a further object to enable virtual 3D objects to be positioned in a normal stage set.

The present invention provides a further object to enable actors who represent foreground objects to wear colours which would otherwise clash with a normal chroma-key background panel. Thus, assuming that a chroma-key background panel in an arrangement such as in WO95/30312 is a combination of light and dark blue patterns in such a prior arrangement the actors cannot wear blue which is extremely restrictive.

In the present invention the actors can wear any colour and the background real set can be any colour.

The background real set does not have to be flat.

In accordance with the present invention a plurality of LED's are positioned in a real stage set, the LED's forming a pattern which is known from an initial measurement of the position of each LED.

The LED's preferably operate in the non-visible spectrum to be thereby non detectable by a normal video camera.

The LED outputs are detected by a detector camera mounted on a TV camera, the pattern formed by the LED's being utilised to compute the position of the TV camera.

The present invention therefore provides a camera positioning system for a virtual studio, said system comprising a camera, an auxiliary detection device mounted on said camera, a plurality of light emitting devices (LED's) mounted in known positions to form a defined array and including electronic detection means connected to said detection device, said detection means comprising position sensing analysis means for analysing the perspective of the defined array, as detected by said detection device, to provide a positional read out defining the position of said camera relative to the LED array.

Preferably the camera is a television camera.

Preferably the detector device comprises a detector camera which is preferable boresighted to be aligned with the TV camera.

In a preferred embodiment the LED's are infra-red operating at a frequency outside the frequency range of the TV camera.

Preferably each LED emits light in a coded form, thereby enabling each light source to be individually identifiable.

Preferably the LED's are fixed to or positioned in a fixed relationship relative to a real scene.

Preferably the LED's are all positioned in plane or a plurality of planes.

The real scene may be a scene painted onto a background as used in theatres or may be an actual location.

The background scene may be any colour or combination of colours.

A plurality of television cameras may be positioned in front of the background scene, each camera being provided with a detecting device.

The present invention also provides a method of determining the position of a camera relative to a background, the method comprising the steps of:

positioning a plurality of LED's in known fixed positions relative to the background, the LED's forming an array;

detecting the positions of at least a proportion of the LED's relative to the camera as the camera moves at each position of the camera; and computing the position of the camera relative to the background.

Preferably the method further includes allocating to each LED in the array a specific code to thereby identify the LED and including the step of interrogating the output of each LED position to identify the code.

Preferably each array comprises at least seven LED's. More preferably each array comprises between 10 and 30 LED's but more or less could be used for more complex or very simple methods.

In a further embodiment the apparatus comprises a virtual reality system camera position system for a virtual studio, said system comprising a television camera providing a video output of a scene, an auxiliary detection device mounted on said television camera, a plurality of light emitting devices (LED's) mounted in known fixed positions to form a defined array within said scene and including electronic detection means connected to said detection device, said detection means comprising position sensing analysis means for analysing the perspective of the defined array, as detected by said detector device, to provide a positional read out defining the position of said television camera relative to the LED array and comprising a virtual object store, a perspective transformation unit and a combiner unit in which the positional read out from the position sensing analysis means is connected to said perspective transformation unit to provide a transformation value, in which the virtual object store is connected to said combiner unit via said perspective transformation unit to transform the perspective and size of a virtual object to be inserted into said combiner unit and in which the video output of the scene provided by said TV camera is connected to said combiner circuit and in which the combiner circuit provides as an output a combined video image in which the virtual object is positioned in said scene.

The invention further provides a method for producing a combined video image comprising a real background scene viewed by a TV camera and a virtual reality foreground object, the method comprising the steps of;

positioning a plurality of LED's in known fixed positions relative to the background scene, the LED's forming an array, detecting the positions of at least a proportion of the LED's relative to the TV camera, as the camera moves, at each position of the camera, computing the position of the camera relative to the background, selecting from a virtual reality store a virtual reality object to be positioned in the real background scene as viewed by the camera, selecting the position for the virtual reality object in the scene, transforming the size and perspective of the virtual reality object to conform to the calculated position of the camera relative to the background scene and combining the virtual reality object with the background scene to form a composite picture.

Embodiments of the present invention will now be described with reference to the accompanying drawings in which.

Figure 1:
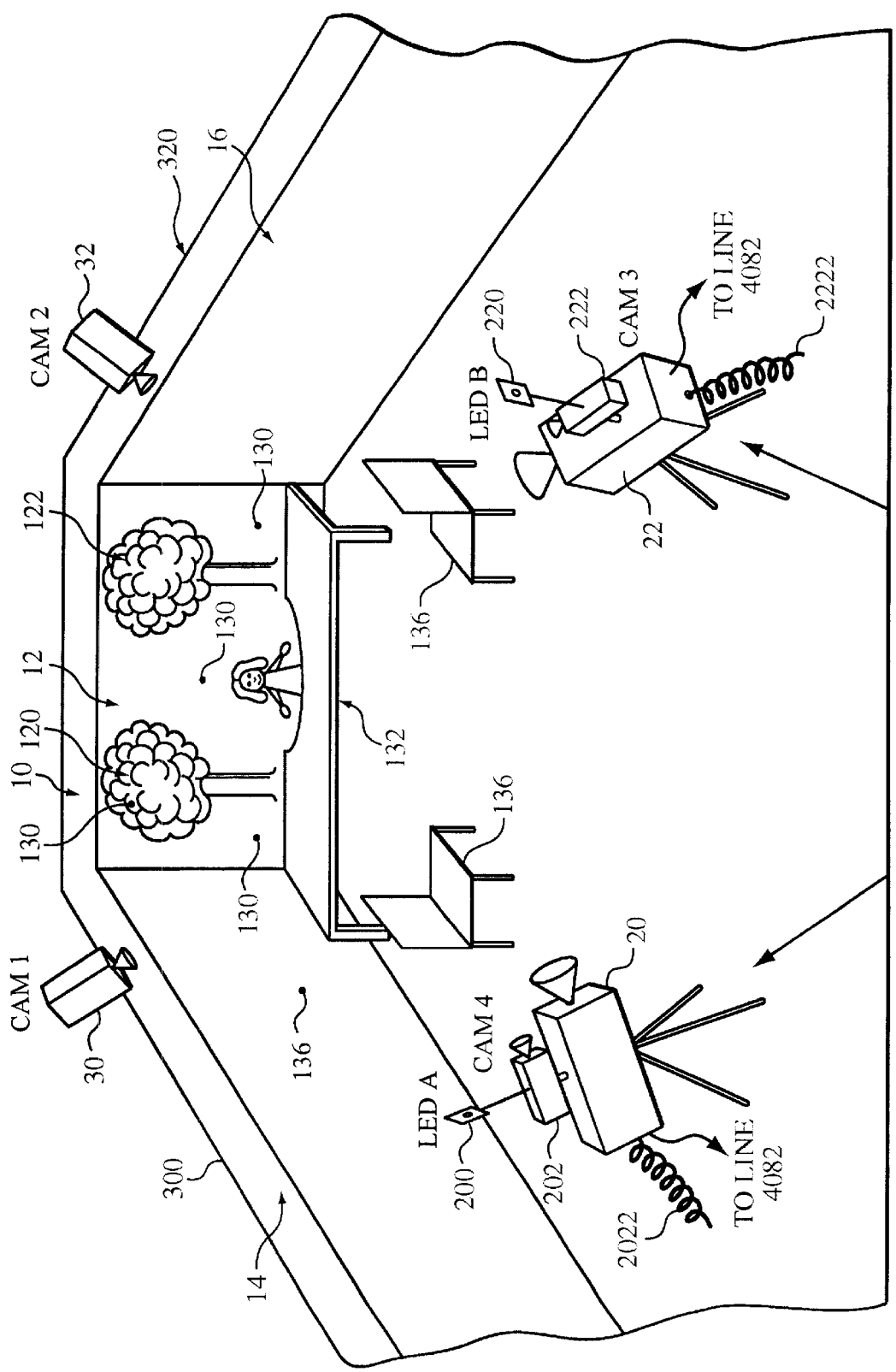
FIG. 1 shows schematically a real background scene with two cameras positioned to photograph or video the background scene.

With reference now to the drawings, FIG. 1 shows a schematic form of a studio set 10 which comprises a backcloth 12 and possible side clothes 14,16. These backcloths may comprise, as in stage sets normal painted backcloths or could comprise actual real objects such as stairs.

Figure 2:
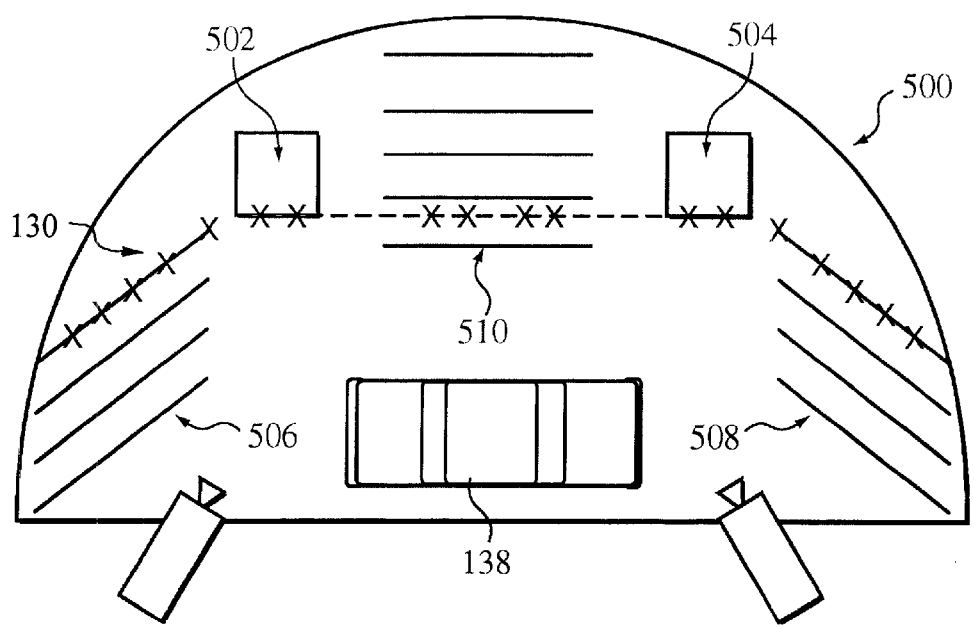
FIG. 2 shows an alternative schematic design of studio set in plan view.
Figure 3:
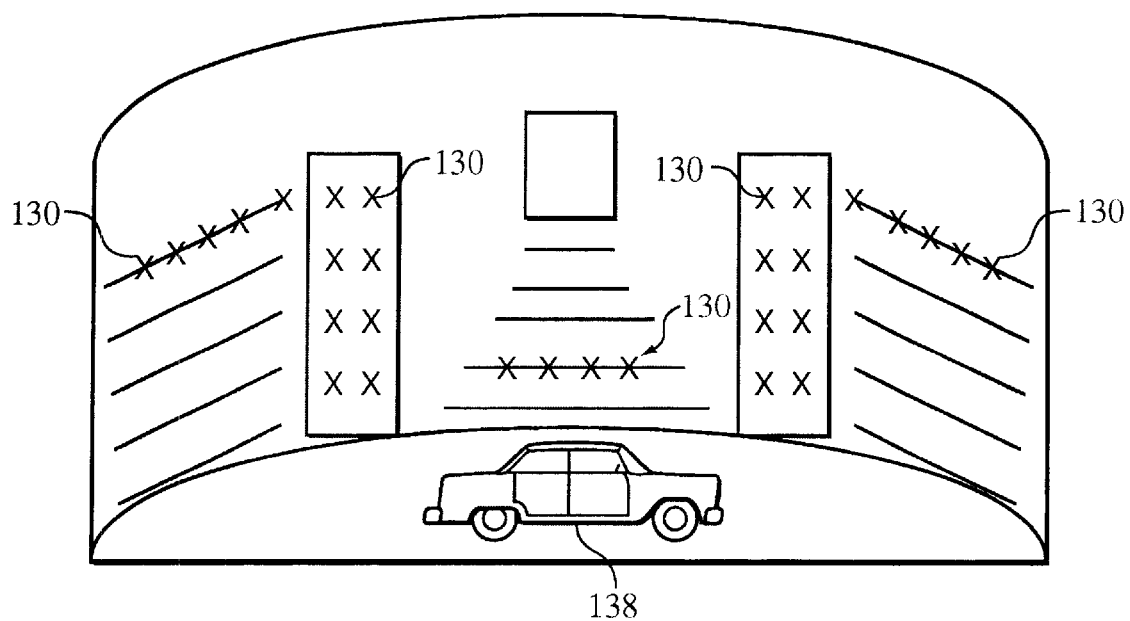
FIG. 3 shows the studio set of FIG. 3 in elevation.

In the embodiment of FIG. 1 the set is assumed to comprise flat back and side clothes but as may be seen, with reference to FIGS. 2 and 3, real sets with solid objects may be used.

With reference to FIG. 1, the set is viewed by one or more cameras 20,22. Each first and second cameras 20,22 is provided with LED's A and B (200, 220).

First and second static cameras 30,32 are provided preferably mounted above the set as shown. They may be mounted on rails 300,320 to be adjustable longitudinally and also in angle of view.

The operation of LED's A and B and cameras 30,32 is to identify and track the position in x, y and z planes of the cameras 20 and 22. This operation is described in the co-pending British Patent Application No. 9702636.3 to the present applicant which should be referred to with reference to the calculation of the position of cameras 20,30 relative to the set 10. The technical content of this prior application is incorporated herein by way of technical explanation.

In this co-pending patent application, as well as in PCT No. WO95/30312, the "backcloth" comprises a chroma-key panel which is provided with a pattern enabling the perspective of the camera field of view relative to the panel to be continuously calculated. With respect to the calculation of perspective, reference is made to PCT No. WO95/30312, the technical content of which is incorporated herein by way of technical explanation.

Both the prior inventions have a practical problem because both require that the background panels are chroma-key. This prevents real sets being used and also prevents actors who represent foreground objects from wearing colours which are the same as the chroma-key panels.

In the present invention, as shown in FIG. 1, the set comprises a background panel which has real views/scenes painted thereon. These are exemplified by trees 120,122.

In the present invention a plurality of further LED's 130 are positioned in the panel. If the panel is a flat panel then the LED's can be set into the surface of the panel. If the panel comprises, as in FIG. 1, a rear panel 12 and two side panels 14,16 then LED's 130 are preferably positioned within such panels.

Each LED may be identical but each LED is preferably switched in a coded sequence to thereby render its identity able to be read. Each LED preferably operates in the infra-red region to thereby not be visible to the eye or to cameras 20,22.

Each camera 20,22 is preferably equipped with an infra-red camera 202,222 which is boresighted (i.e. aligned with the main focal axis) of the camera 20 or 22. The cameras 202,222 provide an image of the array of LED's 130, the number of LED's being imaged depending on the distance which the camera 20,22 is away from the panel 12,13,16.

In order to be able to correctly analyse the position and perspective of camera 20,22 relative to the panel a plurality of LED's must to imaged. thus, if the camera 20,22 is anticipated to show only part of the panel then a larger number of LED's will be required. Generally 7 LED's are considered sufficient and therefore a panel may have between seven (7) and thirty (30) or more LED's to ensure correct alignment calculations.

The system can also operate with a theatre set such as shown in FIGS. 2 and 3.

In FIGS. 2 and 3 the set comprises a generally circular stage 500 (or outdoor setting) with two pillars 502,504 and steps 506,508,510.

The LED's 130 are positioned in a flat plane but the plane comprises portions of the steps 510 and pillars 502,504 as shown in FIG. 3.

With reference to FIG. 2, the LED's associated with steps 510 are positioned slightly in front of the steps as shown. This is to enable a flat plane of LED's to be established even if no actual piece of scenery exists at that exact position.

It is also possible to position LED's on the side steps 506,508 providing the angle between the side steps and the main plane of LED's found by 502, 504 and steps 510 is known. By angular mathematical analysis the position of the LED's 130 in both planes can be determined as can also be the case for LED's in steps 508.

Thus, in the case of FIGS. 1 and 2, 3 there can be positioned virtual objects such as table 132, chairs 134,136 (FIG. 1) or a car 138 as in FIG. 3. It is equally possible to position animated objects or displays in selected positions and for these to move naturally into new positions as cameras 20,22 move.

Figure 4:
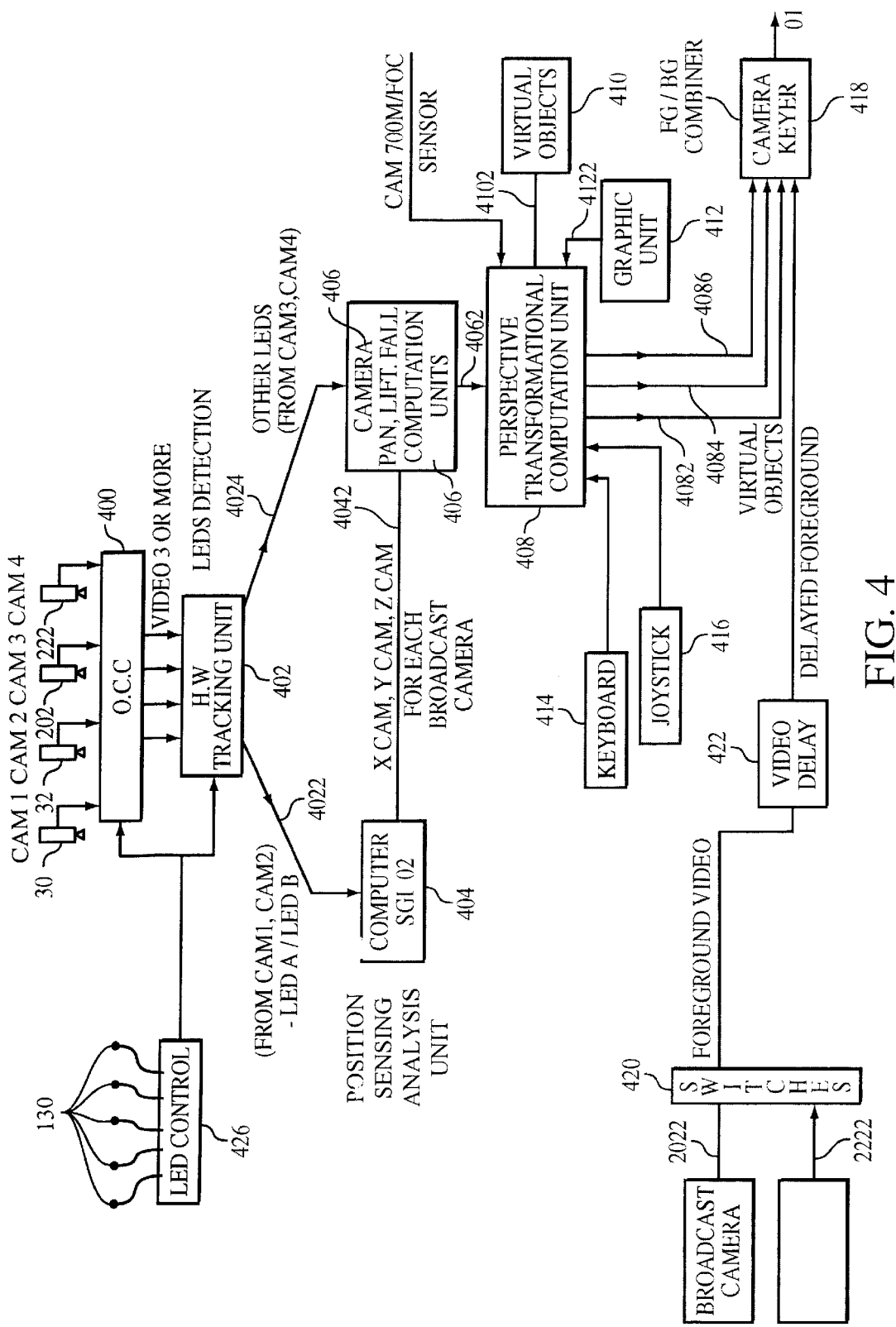
FIG. 4 shows in block diagrammatic form circuitry suitable for the two camera system of FIG. 1.

With reference now to FIG. 4, the inputs from cameras 30,32,202,222 are fed to a computer unit 400 and to a tracking unit 402. Unit 400 can switch between cameras 20,22 to provide position information for either or both cameras.

Unit 400 buffers the input from the cameras 30,32 to provide an output to tracking unit 402 which provides on line 4022 an output signal from the overhead cameras 30,32 which is fed to a position sensing unit 404, the output of which provide on line 4042 x, y and z co-ordinates for each camera 20 or 22. Reference is here made to the above mentioned copending British patent application for a further explanation of calculation of the camera co-ordinates.

The outputs of cameras 202,222 comprise a map of the LED's 130 as viewed and these outputs are fed on line 4024 to a camera pan, tilt and roll computation unit 406, this unit also receiving on line 4042 the x, y and z co-ordinates. The output of unit 406 is fed on line 4062 to a perspective transformation unit 408 which also receives on line 4082 the zoom/focus sensor information of each camera 20,22.

A plurality of virtual objects/animations is stored in a suitable store 410 and selected ones of these are transformed by unit 408 on line 4102 to the correct perspective to be combined with the camera output 20,22 to form a composite picture output such that the viewer sees the real set with real objects and also virtual objects positioned therein. A graphics unit 412 can also input graphical information on line 4122 to appear in the combined video output. Suitable control systems such as a keyboard 414 or joystick 416 can be used to control the positioning of the virtual object or graphics on the screen. The outputs of unit 408 are fed to a combined chroma-keyer unit 418 on lines 4082,4084 and 4086 so that the inserted virtual objects may be combined in the correct perspective, position and size with the foreground video as follows.

The output of each camera is fed on lines 2022,2222 to a switcher 420 which enables the output of a selected camera 20 or 22 to be used by the producer of a program. The output of the selected camera fed via switcher 420 on line 422 is delayed by a delay circuit 422, the delay of which matches the delay in calculating the camera position/orientation via units 400 to 408 thereby ensuring that the foreground information and any virtual insertion information are combined together in the correct sequence in combiner unit 418.

The advantage of the system according to the present invention is that a virtual object may be positioned within a real set because since the size and perspective of the virtual object and also its position relative to the set are known, the virtual object can be positioned within the set. If the object is in front of a part of the set then it will obscure the set and if behind it will be obscured by the set.

Figure 5:
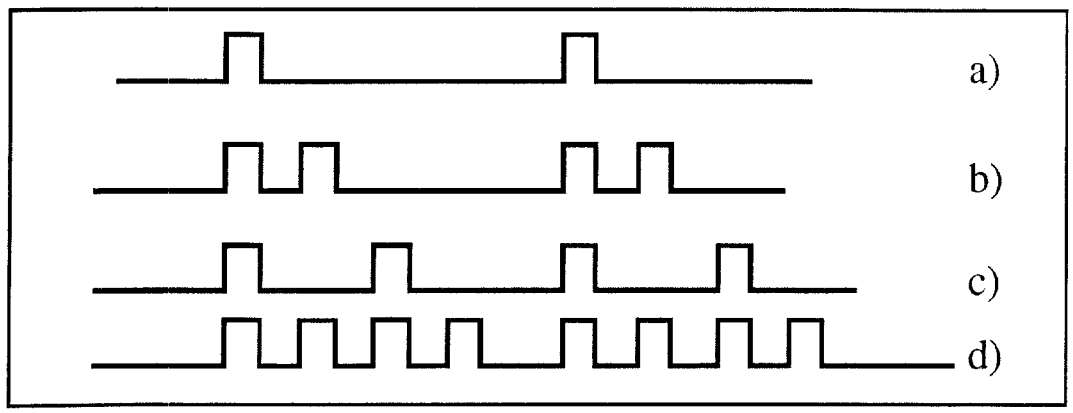
FIG. 5 shows coding sequences suitable for the LED's.

Referring now to FIG. 5, simplified digital codes are shown to illustrate a preferred embodiment. In this embodiment only four codes a), b), c) and d) are shown. Each LED is controlled by a control unit 424 to switch in accordance with a defined code.

In FIG. 5 four digital codes are shown 10000000, 10100000, 10010000 and 101010100. Obviously other combinations can be selected to provide for a plurality of LED's, all of which are identifiable by unit 400.

The position of each LED 130 in the real set must be known and this can be accomplished either by having camera 20 moved into a fixed known position and known focus and zoom and then calculating the position of each LED by reference to the read out of camera 202. Alternatively the LED's can be placed in known positions.

Figure 6:
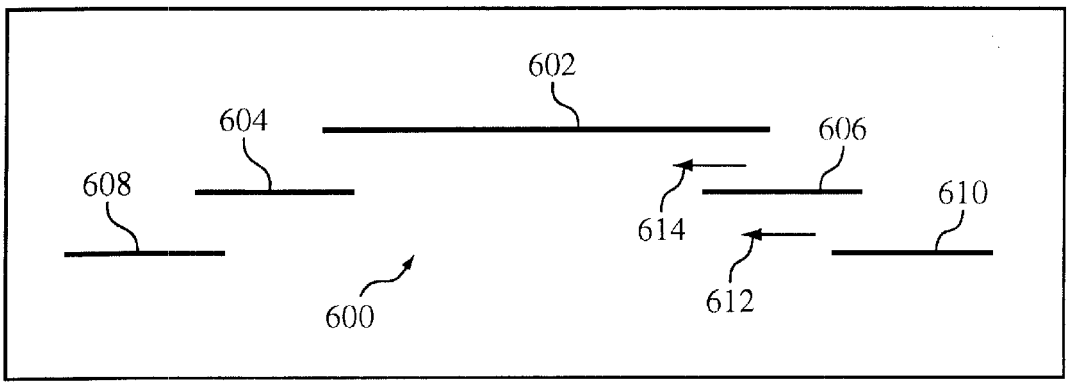
FIG. 6 shows the scene of FIG. 4 in plan view.
Figure 7:
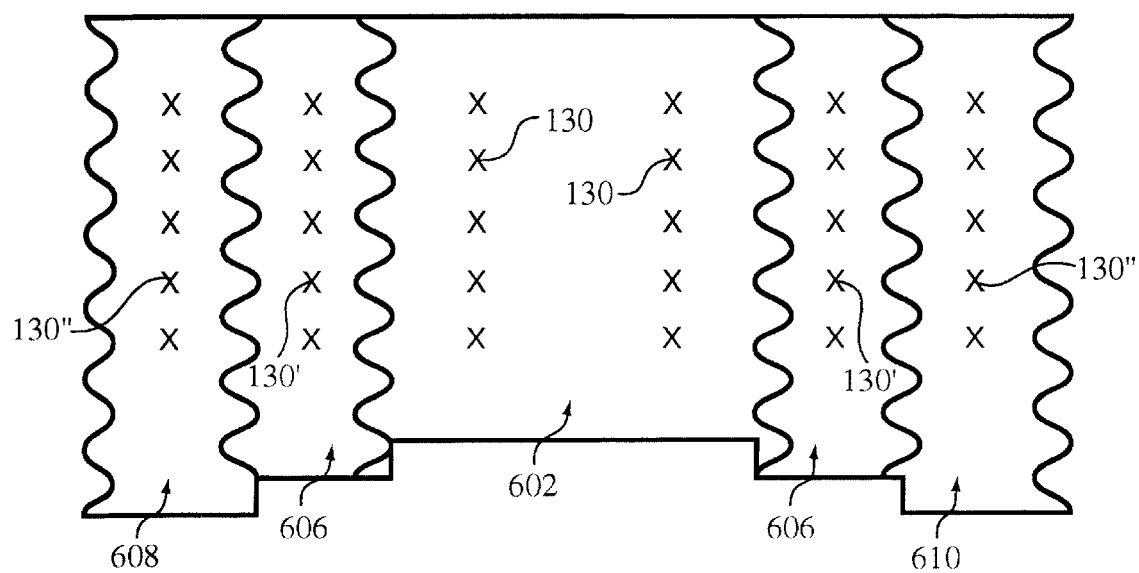
FIG. 7 shows an alternative background scene in elevation.

With reference to FIGS. 6 and 7, the advantage of the present invention can be seen with a stage set 600 comprising a main backcloth 602, first and second side (wing) cloths 604,606 and third and fourth side (wing) cloths 608, 610.

Each cloth 602–610 may be painted as usual for a stage set.

On each cloth 602–610 a number of LED's may be positioned. Those on cloth 602 are referenced 130 and on cloths 604,606 are 130' and cloths 608,610 are 130".

Each LED will have a coded output in the infra-red which will determine not only its position in the cloth 602,604, 606,608 or 610 but also which cloth is located in. Thus, the computer program can determine the position of the camera by reference to LED's in more than one plane.

An advantage here is that actors can enter and exit from the wings via openings indicated by arrows 612;614 in the normal manner and virtual objects can also be made to enter and exit. Therefore the system is far more versatile than the previous known chroma-key system.

In a further embodiment, as illustrated in FIG. 1, two LED's 221,223 are mounted on the cameras 20,22 parallel to the optical axis 225 of the camera. Only camera 22 is described for ease of explanation. This enables the position and pan/tilt of the camera to be measured.

To obtain information on the zoom and focus of the camera, sensors are mounted on the lens. Alternatively, the output of lens potentiometers which are present on many standard studio lenses may be read to obtain information on the zoom/focus status of the camera/

Additionally, by mounting three further LED's 227,229, 231 on the camera in a triangle, the roll of the camera can be detected, thus allowing shoulder mounted cameras to be used.

The outputs of the additional LED's 221,223,227,229 and 231 are preferably suitably coded to ensure correct identification by the position sensing equipment to enable the position and pan/tilt/roll of the camera to be correctly measured.

If more than one camera is used, then all cameras may be so equipped.

What is claimed is:

1. A camera positioning system for a virtual studio, said system comprising a camera, an auxiliary detection device mounted on said camera, a plurality of light emitting devices (LED's) mounted in known positions to form a defined array, said defined array being within the field of view of said camera, and including electronic detection means connected to said detection device, said detection means comprising position sensing analysis means for analyzing the perspective of the defined array, as detected by said detection device, to provide a positional read out defining the position of said camera relative to the LED array.

2. A camera positioning system as claimed in claim 1 in which the camera is a television camera.

3. A camera positioning system for a virtual studio, said system comprising a camera, an auxiliary detection device mounted on said camera, a plurality of light emitting devices (LED's) mounted in known positions to form a defined array and including electronic detection means connected to said detection device, said detection means comprising position sensing analysis means for analyzing the perspective of the defined array, as detected by said detection device, to provide a positional read out defining the position of said camera relative to the LED array, the detector device comprising a detector camera which is boresiglited to be aligned with the camera.

4. A camera positioning system as claimed in claim 1 in which the LED's are infra-red operating at a frequency outside the frequency range of the camera.

5. A camera positioning system as claimed in claim 1 in which each LED emits light in a coded form, thereby enabling each light source to be individually identifiable.

6. A camera positioning system as claimed in claim 1 in which the LED's are fixed to or positioned in a fixed relationship relative to a real scene.

7. A camera positioning system as claimed in claim 6 in which the LED's are all positioned in a single plane.

8. A camera positioning system as claimed in claim 7 in which the real scene is a scene painted onto a background scene as used in theatres.

9. A camera positioning system as claimed in claim 8 in which the background scene may be any colour or combination of colours.

10. A camera positioning system as claimed in claim 1 in which a plurality of television cameras are positioned in front of the background scene, each camera being provided with a detecting device.

11. A camera positioning system as claimed in claim 1 further comprising two LED's mounted on the camera in positions parallel to the optical axis of the camera to enable the position and pan/tilt of the camera to be measured.

12. A camera positioning system as claimed in claim 11 in which three further LED's are mounted on the camera in a triangle to enable the roll of the camera to be measured.

13. A method of determining the position of a camera relative to a background, the method comprising the steps of:

positioning a plurality of LED's in known fixed positions relative to the background, the LED's forming a defined array, said defined array being within the field of view of the camera;

detecting the positions of at least a proportion of the LED's relative to the camera as the camera moves at each position of the camera; and computing the position of the camera relative to the background.

14. A method of determining the position of a camera as claimed in claim 13, the method further including allocating to each LED in the array a specific code to thereby identify the LED and including the step of interrogating the output of each LED position to identify the code.

15. A method of determining the position of a camera as claimed in claim 14 in which each array comprises at least seven LED's positioned in known positions.

16. A method of determining the position of a camera as claimed in claim 14 in which each array comprises between 10 and 30 LED's positioned in known positions.

17. A virtual reality system camera position system for a virtual studio, said system comprising a television camera providing a video output of a scene, an auxiliary detection device mounted on said television camera, a plurality of light emitting devices (LED's) mounted in known fixed positions to form a defined array within said scene and including electronic detection means connected to said detection device, said detection means comprising position sensing analysis means for analysing the perspective of the defined array, as detected by said detector device, to provide a positional read out defining the position of said television camera relative to the LED array and comprising a virtual object store, a perspective transformation unit and a combiner unit in which the positional read out from the position sensing analysis means is connected to said perspective transformation unit to provide a transformation value, in which the virtual object store is connected to said combiner unit via said perspective transformation unit to transform the perspective and size of a virtual object to be inserted into said combiner unit and in which the video output of the scene provided by said TV camera is connected to said combiner circuit and in which the combiner circuit provides as an output a combined video image in which the virtual object is positioned in said scene.

18. A method for producing a combined video image comprising a real background scene viewed by a TV camera and a virtual reality foreground object, the method comprising the steps of:

positioning a plurality of LED's in known fixed positions relative to the background scene, the LED's forming a defined array, said defined array being within the field of view of the TV camera, detecting the positions of at least a proportion of the LED's relative to the TV camera, as the camera moves, at each position of the camera, computing the position of the camera relative to the background, selecting from a virtual reality store a virtual reality object to be positioned in the real background scene as viewed by the camera, selecting the position for the virtual reality object in the scene, transforming the size and perspective of the virtual reality object to conform to the calculated position of the camera relative to the background scene and combining the virtual reality object with the background scene to form a composite picture.

19. A camera positioning system as defined in claim 6 in which the LEDs are positioned in a plurality of planes.

20. A camera positioning system as claimed in claim 7 in which the real scene is an actual location.

* * * * *

UNITED STATES PATENT AND TRADEMARK OFFICE
CERTIFICATE OF CORRECTION

PATENT NO. : 6,559,884 B1
DATED : May 6, 2003
INVENTOR(S) : Michael Tamir and Avi Sharir It is certified that error appears in the above-identified patent and that said Letters Patent is hereby corrected as shown below:

<u>Title page,</u>
Item [56], References Cited, FOREIGN PATENT DOCUMENTS,
insert -- WO   96/18925     06/1996 --.

<u>Column 6,</u>
Line 52, replace "boresiglited" with -- boresighted --.

Signed and Sealed this

Sixteenth Day of September, 2003

JAMES E. ROGAN
*Director of the United States Patent and Trademark Office*